Nov. 10, 1925.

A. W. ALMQUIST 1,561,294

ROLLING MACHINE FOR PISTON RINGS

Filed Nov. 2, 1923

WITNESS:
Rob R Kitchel.

INVENTOR
Amandus W. Almquist
BY
Augustus B. Stoughton
ATTORNEY.

Patented Nov. 10, 1925.

1,561,294

UNITED STATES PATENT OFFICE.

AMANDUS W. ALMQUIST, OF WEST ORANGE, NEW JERSEY, ASSIGNOR TO TWIN PISTON RING CORPORATION, OF NEWARK, NEW JERSEY, A CORPORATION OF NEW JERSEY.

ROLLING MACHINE FOR PISTON RINGS.

Application filed November 2, 1923. Serial No. 672,372.

*To all whom it may concern:*

Be it known that I, AMANDUS W. ALMQUIST, a citizen of the United States, residing at West Orange, in the county of Essex and State of New Jersey, have invented a new and useful Improvement in Rolling Machines for Piston Rings, of which the following is a specification.

The principal objects of the present invention are, first, to provide a machine for rolling tension into piston rings in such a way that they will exert substantially the same pressure in all radial directions, or, in other words, will in use exert uniform wall pressure in a cylinder; second, to provide for subjecting portions of the rings to the same unit pressure although the wall thickness of different rings varies a few thousandths of an inch; third, to provide for the application of proper and, if desired, varying linear rolling pressure per inch of circle of ring; and fourth, to provide for fast operation to reduce the cost of production, to obtain accuracy in the work, and to produce strong piston rings.

The invention comprises the improvements to be presently described and finally claimed.

In the following description reference will be made to the accompanying drawings forming part hereof and illustrating an embodiment of the invention and in which Figure 1 is a top or plan view of a machine embodying features of the invention.

Figure 4:
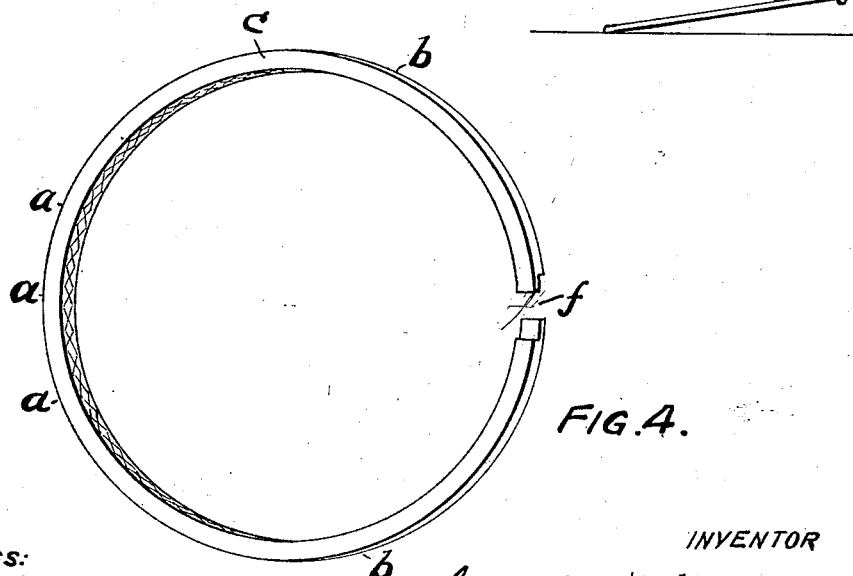
Fig. 4 is a perspective view illustrating a piston ring which is the product of the machine.

In the drawings 1 is a revoluble annulus and it is shown as the inner race of a bearing 2 having rolling elements $2^a$. 3 is a roller die revolubly mounted in the annulus 1 and a portion of its periphery is not a true circle but is cycloidal or parabolic in shape, or, in other words, is of cam form. This portion is roughened in the nature of points, for example in diamond shape or with letters or combinations of letters, for instance, the company's name or trade mark or any other markings that are desired on the interior of the finished piston ring. An example of the roughening and the extent of the cam surface is 70% of the circumference of the roller die. In general, the shape of the cam is such that the greatest unit rolling pressure is exerted opposite to the split $f$ in the piston ring and in the general location indicated by the letter $a$ in Fig. 4, and that this pressure diminishes on each side of the region $a$ to the points generally indicated at $b$ in Fig. 4. It may be stated that a piston ring rolled in the manner described exerts substantially uniform pressure in all radial directions against a cylinder wall when in use. The roller die 3 is shown as mounted on a spindle 4 revoluble in the frame 5 and driven by toothed wheels 6. The revoluble annulus or inner race 1, or in fact the roller bearing, is mounted in a slide 7 movable in ways 8 on the frame 5. 9 indicates means for driving the roller die 3 through one revolution of the piston ring and for then stopping it, and the means 9 are started manually. These means 9 specifically are well understood and they form no part in themselves of the present invention. The means 9 include a pulley $9^a$ and an overrunning throw-out clutch $9^b$. 10 is a screw working in a nut 11 fast to and depending from the slide 7, and this screw is turned by a worm 12 and worm wheel 13. The worm is fitted with a pair of wheels 14 and 15. The wheel 14 has connected with it a weight 16 arranged to tend to turn the worm in one direction, and the wheel 15 is fitted with a cord 17 shown as operated by a pedal 18 and arranged to turn the worm in the other direction. 19 is a hard metal plate arranged at the top of the frame 5 and intended to resist the wear that would be caused by rolling a great number of piston rings.

Figure 1:
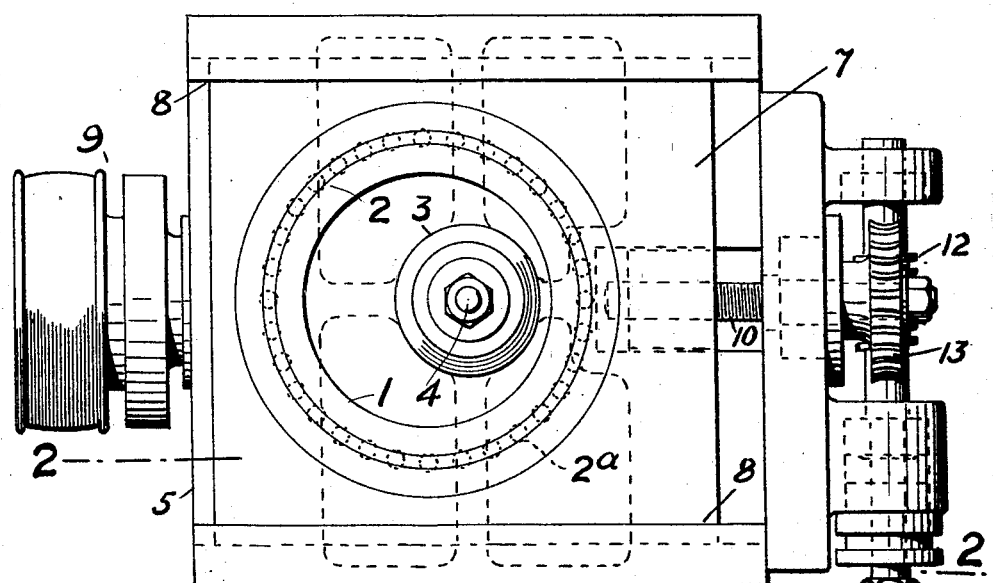
Figure 2:
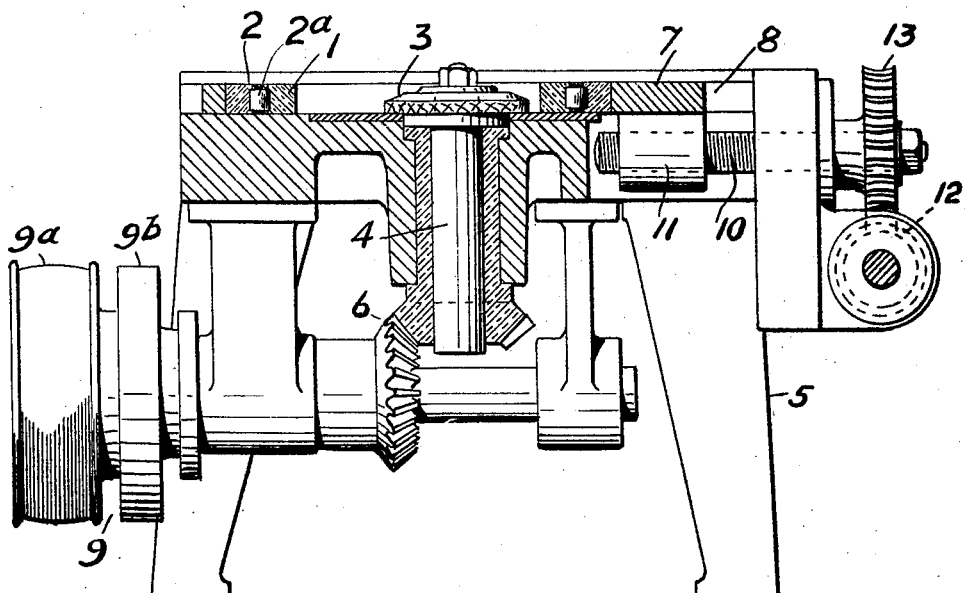
Fig. 2 is a sectional view taken on the line 2—2 of Figure 1.
Figure 3:
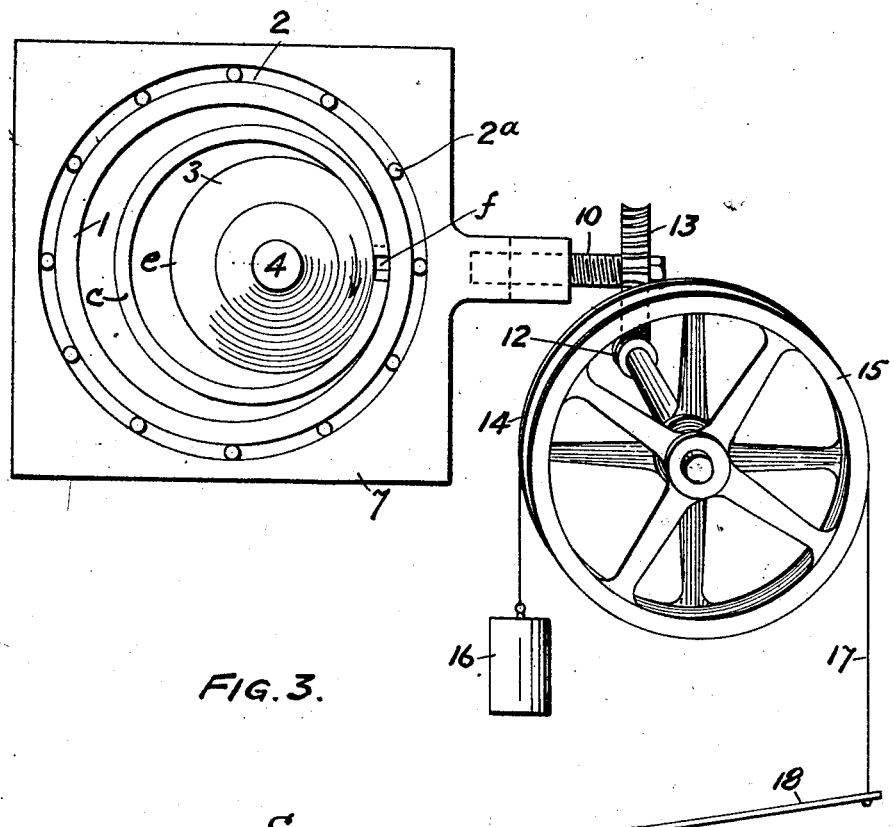
Fig. 3 is a diagrammatic view illustrating the rolling elements in plan and the adjusting elements principally in elevation.

The mode of operation may be described as follows:

With the parts at rest the pedal 18 is actuated to move the slide 7, in the present instance toward the right, which affords space between the inner surface of the race 1 and the periphery of the roller die 3 for the insertion of a piston ring $c$. It may be remarked, under the assumption that the machine has previously come to rest, that the high part of the cam portion of the roller die 3 is in the general location, indicated at e in Fig. 3, and that the split f in the ring is properly placed in respect to the cam part. The pedal 7 is then released and the weight 16, acting through the worm gearing, shifts the slide toward the roller die 3 and into contact with the piston ring, and this contact is uniform with different rings because the action of the weight 16 is constant. It may be remarked that the worm and worm wheel 12 and 13 and connected parts prevent retrograde motion of the slide during the rolling operation. The gear or mechanism 9 is then permitted to perform its function, being started manually and automatically stopped, with the result that the piston ring is rolled between the race 1 and the roller die 3 in the manner described and with the results pointed out. With each piston ring there is a repetition of the described operation.

It will be obvious to those skilled in the art that modifications may be made in details of construction and arrangement and in mere matters of form without departing from the spirit of the invention which is not limited to such matters or otherwise than as the state of the art and the appended claims may require.

I claim:

1. A rolling machine for piston rings comprising in combination a horizontal slide, a revoluble annulus mounted horizontally on the slide and adapted to receive a piston ring overlying the slide, a roller die revolubly mounted in the annulus for co-operation with the inner wall thereof and having a portion of its periphery roughened and of cam form to roll portions of the piston ring opposite to its split with different degrees of pressure, means for rotating the die, and a weight for holding the slide and annulus with a constant pressure.

2. A rolling machine for piston rings comprising in combination the inner race of a horizontally disposed bearing having rolling elements, a roller die revolubly mounted within said race and having a portion of its periphery roughened and of cam form, means for driving the roller die through a definite distance and for then stopping it, an adjustable slide for the bearing, a plate on the slide underlying the inner race and the die and adapted to support a piston ring, and a weight for holding the race up to its work.

3. A rolling machine for piston rings comprising in combination the inner race of a bearing having rolling elements, a roller die revolubly mounted within said race and having a portion of its periphery roughened and of cam form, means for driving the roller die through a definite distance and for then stopping it, a horizontal slide for the bearing, worm gear for the slide, weighted means acting on the worm gear for positioning the slide, and manual means acting on the worm gear for retracting the slide.

AMANDUS W. ALMQUIST.